3,125,992
ANIMAL RETRIEVER
Charles Edward King, R.R. 8, Greensburg, Ind.
Filed Oct. 22, 1962, Ser. No. 232,072
1 Claim. (Cl. 119—154)

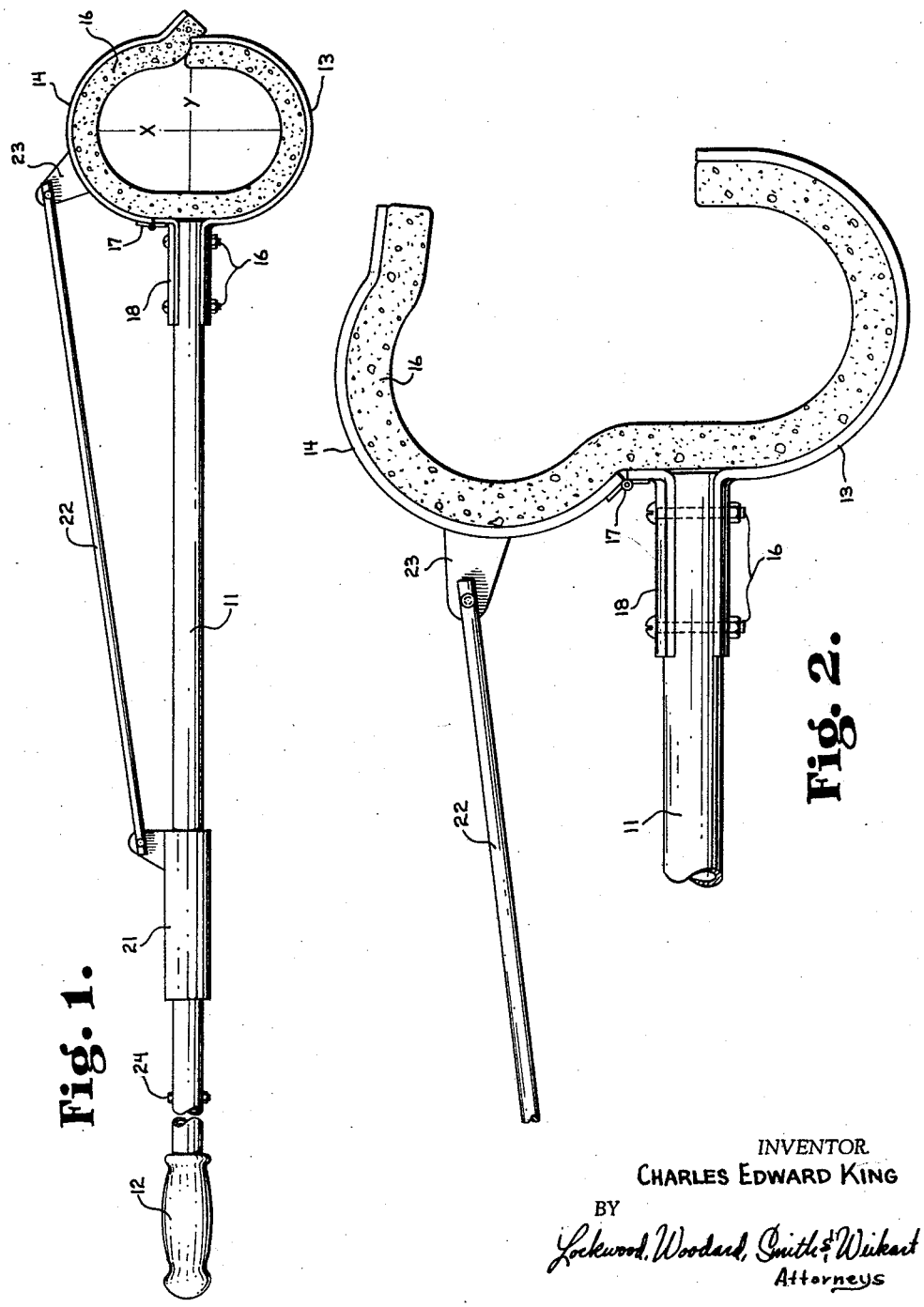

This invention relates generally to animal retrievers and particularly to a device for handling small baby animals.

There are instances in which it is desirable to be able to handle, lift and carry very small baby animals from one location to another but in which instances, it is either impossible to reach or undesirable to pick up the animal directly. An example of such an instance is in the case of sows farrowing in the wintertime in unheated shelters. Frequently, when pigs are born, it is necessary for them to move around the stall on their own and without help in order to locate the sow's breast for nursing. On occasions some of the newborn pigs will huddle in a corner next to the outside wall of the farrowing house and will become chilled and die in a short time. Heretofore, in order to get the pigs in position to nurse, it was necessary to actually enter the farrowing house, pick up and move the pigs by hand. This is frequently hazardous inasmuch as it is practically impossible to do without disturbing the sow.

It is, therefore, a general object of the present invention to provide means whereby an animal can be picked up and moved without getting too close to the animal.

A further object is to provide means for delicately handling a very small animal.

A further object is to provide a device for achieving the foregoing objects and which can be easily handled and operated.

Described briefly, a typical embodiment of the present invention includes an elongate handle with a pair of curved members at one end thereof, one of the members being affixed to the handle and the other member being pivotally mounted thereto.

A hand grip in the form of a sleeve is mounted on the handle and axially slidable thereon and connected to the pivotally mounted member by means of a link whereby the member can be pivoted by moving the hand grip axially along the handle. An integral strip of soft elastic material is secured to both the movable and fixed members to protect the animal being handled by the retriever.

The full nature of the invention will be understood from the accompanying drawings and the following description and claims:

FIG. 1 shows a side elevation of a typical embodiment of the present invention with the members closed.

FIG. 2 is a fragmentary view of the curved members in an open condition, this view being drawn to an enlarged scale.

Referring to the drawings in detail, the handle 11 may be made of three-fourths inch diameter aluminum tubing sixty inches long. A suitable cap 12, which may be of rubber, for example, is provided at one end of the handle to facilitate the holding of that end. Curved members 13 and 14 are provided at the end opposite the cap 12. The member 13 which may be typically made of three-fourths inch wide, one-eighth inch thick malleable steel, for example, is secured to the handle 11 by means of a pair of bolts 16. The other curved member 14 which may also be made of a similar strip of malleable steel, for example, is pivotally mounted by means of the hinge 17 to the bracket 18 which is also secured to the handle by means of the bolts 16.

An elongate hand grip 21 which may be in the form of an aluminum sleeve, one inch in diameter and four inches long, for example, is mounted on the handle 11 and is axially movable therealong. A rod 22 is pinned to the forward end of the hand grip 21 and is also pinned to the lug 23 secured to the member 14. The rod thereby provides a link connecting the member 14 to the axially movable grip 21 by means of which the member 14 can be pivoted on the hinge 17 by axial movement of the grip 21. A bolt 24 is typically passed through the handle 11 at a location whereby it prevents excessive movement of the grip 21 toward the cap 12 and thereby avoids a possibility of the member 14 opening too far to be closeable again by moving the sleeve toward the member 14. In other words, it prevents the member 14 from opening so far that the forward end of the rod 22 meets the lug 23 at a point lying between the axis of the handle 11 and a line drawn from the hinge 17 to the junction of the rod 22 with the grip 21.

A single integral strip 26 of a soft resilient material such as polyethylene foam, for example, is secured by adhesive to both of the members 13 and 14. The shape of the members 13 and 14 is generally semi-circular but it is preferable that they be such as to provide a three inch dimension in the direction designated by "X" in the drawing when the members 13 and 14 are closed. It is also desirable that a two inch dimension be provided in the direction designated by "Y" in the drawing when the members are closed. These dimensions are, of course, only exemplary but have been found the most satisfactory for use of the retriever with small pigs. It should be noted that by virtue of the slight overlap of the free ends of the members 13 and 14, it is impossible to close the member 14 excessively and thus, possible injury to the pig is prevented.

In addition to the obvious benefits derived from the present invention, other benefits which may not immediately be apparent should perhaps be mentioned. By reason of the fact that the operation of the pivotally mounted member is affected by a sleeve moved axially along the handle, the desired opening and closing functions of the member 14 can be achieved precisely, reliably and easily regardless of what might be the orientation of the plane in which the two members 13 and 14 are deposited at any time during the animal handling operation. If a pig happens to be extremely small in size, the members 13 and 14 can be positioned and closed to form a ring around the pig's body and then the handle may be turned on its longitudinal axis to orient the pig so that its forelegs hang over the members 13 and 14 whereby he can be picked up and moved even though he might be quite small.

Having the free ends of the members 13 and 14 overlap makes it possible to completely encircle, with the padding material 26, the bodies of pigs of a wide range of sizes. Thus, there is no danger of the pig falling out between the ends of the members.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

An animal retriever comprising;
    an elongate handle having a longitudinal axis;
    a first curved member affixed to said handle adjacent an end thereof;
    a second curved member; pivot means pivotally mounting said second member to said handle for closing said second member with said first curved member to form a ring substantially symmetrical with respect to a plane normal to said axis;
    an elongate hand grip said grip being in the form of a cylindrical sleeve coaxial with said handle and axially movable on said handle;

and a rod having a connection to said grip and a connection to said second member for connecting said grip to said second member for pivoting said second member by axial movement of said sleeve, said connections and said pivot means all being located on one side of said handle axis, and said hand grip being of a length sufficient to receive the hand of an operator to facilitate manual support of said handle in a direction transverse of the length thereof and simultaneously to facilitate the manual production of axial movement of said grip to pivot said second member.

References Cited in the file of this patent
UNITED STATES PATENTS

| | | |
|---|---|---|
| 913,619 | Church | Feb. 23, 1909 |
| 1,297,319 | Bullard | Mar. 18, 1919 |
| 1,659,701 | Pocha | Feb. 21, 1928 |